March 19, 1957 — F. R. BOKORNEY — 2,785,572
CRADLE SUPPORT FOR BALANCING APPARATUS
Filed April 3, 1953 — 2 Sheets-Sheet 1
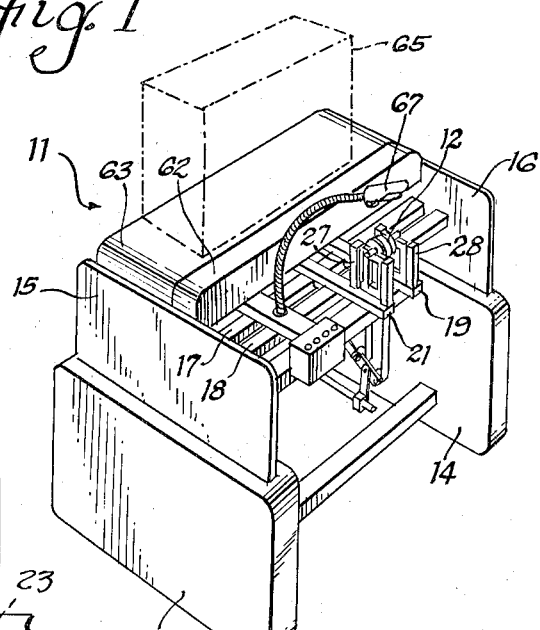
Fig. 1
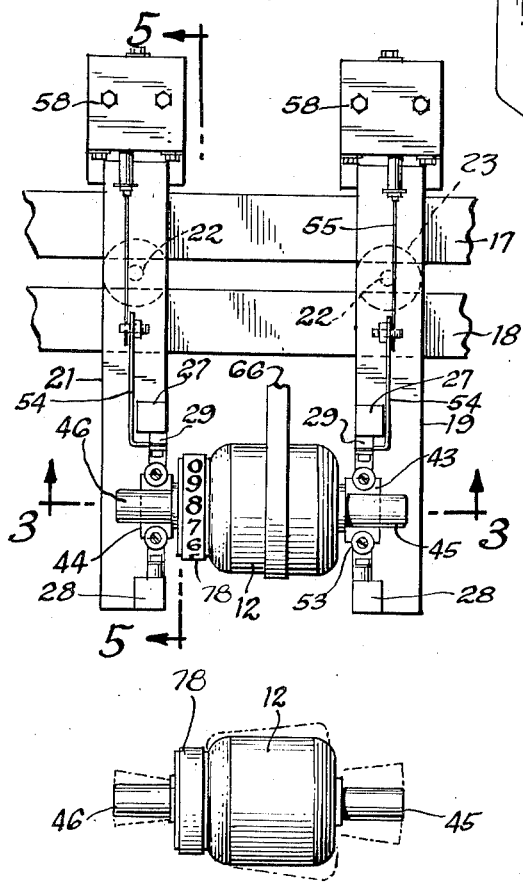
Fig. 2
Fig. 4
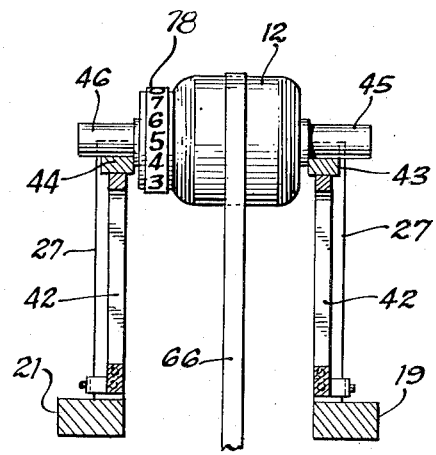
Fig. 3
INVENTOR.
Fred R. Bokorney
BY
Attorney March 19, 1957 F. R. BOKORNEY 2,785,572
CRADLE SUPPORT FOR BALANCING APPARATUS
Filed April 3, 1953 2 Sheets-Sheet 2
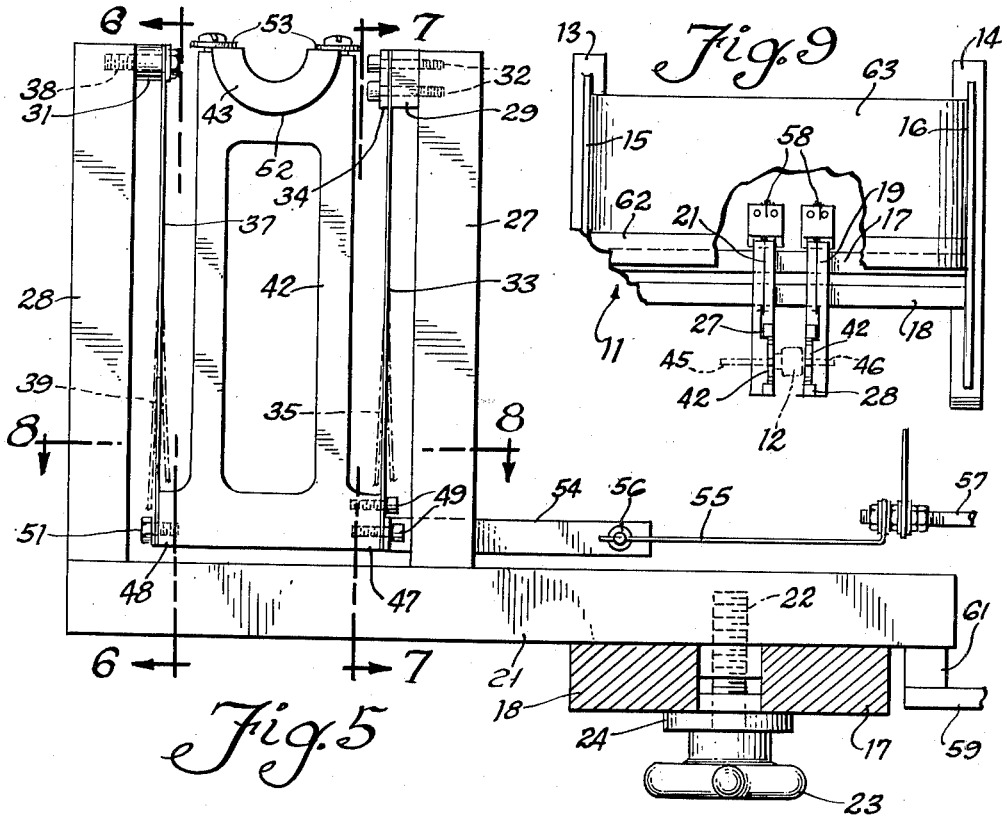
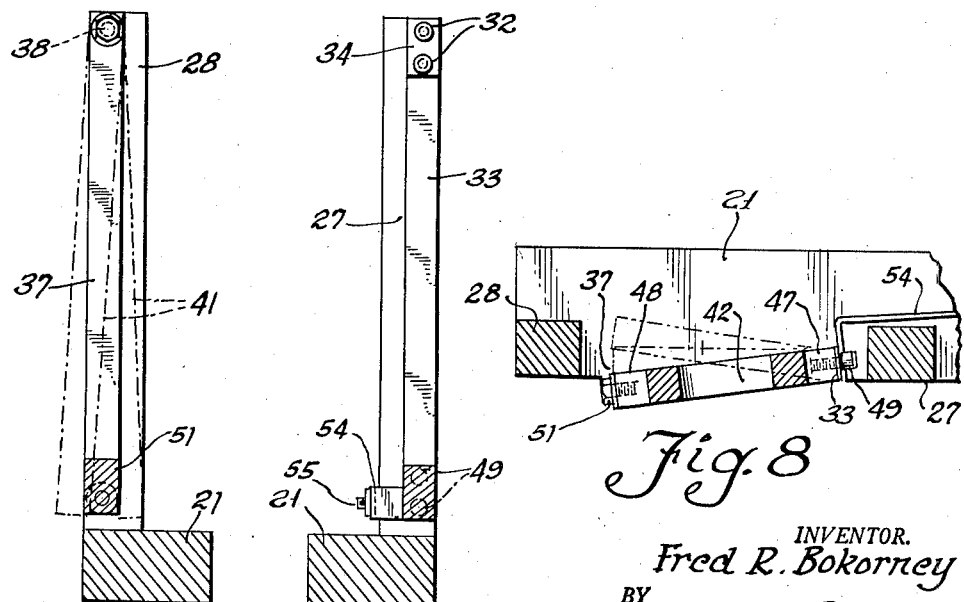
INVENTOR.
Fred R. Bokorney
BY
Attorney United States Patent Office 2,785,572
Patented Mar. 19, 1957

2,785,572

CRADLE SUPPORT FOR BALANCING APPARATUS

Fred R. Bokorney, Maywood, Ill.

Application April 3, 1953, Serial No. 346,766

6 Claims. (Cl. 73—466)

The present invention relates to balancing machines, and concerns itself more particularly with cradle support apparatus for rotors which will aid production line methods of determining the location and magnitude of unbalance.

There have been evolved certain principles and techniques for determining unbalance conditions in rotors by subjecting them to vibratory testing while they are rotated. Depending upon the axial length of a rotor, vibration measurements may be made in one or more transverse planes at arbitrarily selected longitudinal positions for purposes of measuring unbalance. Under such testing, plural unbalance conditions will generate multiple eccentricities or wobbles with the bearing axis generating opposed intersecting cones.

At each of a pair of arbitrarily located supporting journals there will be transmitted vibrations which have an angular periodicity in relation to the testing cycle as well as a characteristic amplitude or degree of distortion and consequent distortive angle. The present invention concerns itself with the design of an efficient, highly responsive bearing support apparatus or cradle which will afford the advantages of accommodation to a wide range of sizes of rotor elements and their axial shafts, while at the same time possess delicate response characteristics whereby to submit faithfully and accurately to the amplitude and phase characteristics of the dynamic forces which are exerted upon it.

Accordingly, a principal object of the present invention is one of providing a versatile balancing machine cradle support capable of being adapted to an infinite range of rotor element proportions for transmitting vibrations to an electromechanical pickup device which denotes the circumferential location and magnitude of unbalance conditions.

Another object of the present invention is to provide a balancing machine cradle in which rotors under test are supported at an easy access work level unhampered by machine frame structure from being closely observed or regulated, and in which the impulse vibrations, although generated at a higher and more convenient level, are transmitted to an electromechanical pickup device disposed in a safe and non-interfering range at a lower level.

Yet another object of the present invention is to provide a balancing machine rotor support cradle in which the horizontal axial position is held relatively inert except for predeterminable adjustment, while through a pendulous supporting media transverse vibrational responses are communicated faithfully to an electrical pickup device.

The manner in which the foregoing and other objects and advantages of the present invention are accomplished will become apparent during the course of the following detailed description, having particular reference to the accompanying drawings wherein like reference numerals designate corresponding parts throughout and in which, Fig. 1 is a perspective view of a balancing machine embodying certain features of the invention.

Fig. 2 is a fragmentary plan view of a pair of cradle support members embodying certain features of the present invention.

Fig. 3 is a fragmentary sectional view taken approximately on line 3—3 of Fig. 2.

Fig. 4 is a detail plan view of a motor armature or other rotor element under test such as may be supported in cradle support fixtures of the type illustrated in Figs. 2 and 3.

Fig. 5 is a transverse sectional view taken approximately on line 5—5 of Fig. 2.

Fig. 6 is a fragmentary detail sectional view taken approximately on line 6—6 of Fig. 5.

Fig. 7 is a fragmentary detail sectional view taken approximately on line 7—7 of Fig. 5.

Fig. 8 is a fragmentary plan sectional view taken approximately on line 8—8 of Fig. 5, showing the cradle support fixture in exaggerated extremes of displacement; and Fig. 9 is a plan view with portions broken away of a balancing machine on which are mounted a pair of cradle support fixtures embodying certain features of the present invention.

Unbalance in the rotatable element of a machine is usually caused by non-homogeneous or non-symmetrical development which results in a principal inertia axis being displaced from the journal axis. In a rotor which has substantial axial length these conditions may occur in different degrees and at various places along the length of the rotor shaft. The conditions of unbalance singly or in resolution may occur at different angles with respect to the periphery. The problem of dynamic balancing concerns itself, therefore, with making a determination of the angular positions with respect to the periphery of a total or resolution of unbalance conditions as well as to provide indications expressible in units of measurement regarding the magnitudes of the unbalance conditions.

It has become customary to measure unbalance in ounce-inches or gram-centimeters which is an arbitrary unit of measurement of the factors which produce centrifugal force.

Correction for unbalance may be made in one of several methods. Depending upon the nature of the subject matter, correction may be accomplished by adding mass to the underweighted side or by removing mass from the overweighted side until the unbalanced condition is eliminated.

In volume production of rotors during which correction is to be made on account of unbalance, the manual technique may be profoundly assisted and speeded up by various conveniences in both the testing and correction operations. These are directed toward the saving of time necessary to make the unbalance readings as well as toward the making of corrections within a minimum cost range.

Placement and removal of rotor parts in order to be efficiently accomplished requires to be made under conditions most favorable to human manipulation. Accessibility from various angles to the supporting fixtures on which these piece parts are placed and rotated should be gained with ease and facility for in these considerations there is to be found the difference between successful and prohibitive production line operations.

Referring now more particularly to the accompanying drawings, the reference numeral 11, Figs. 1 and 9, denotes generally a side-frame balancing machine of such proportion as to be suitable for use in the dynamic testing of small and intermediate sized rotors 12 which in the illustrated embodiment takes the form of an electric motor armature. The side-frame base members 13 and 14 constitute sturdy rectangular assemblies provided with leveling facilities on which are integrally mounted the work level support or stanchion plates 15 and 16 respectively. The manner in which the frame and other structural parts of this machine may be constructed is disclosed in copending application, Serial No. 350,011, filed April 21, 1953.

Between the two side-frame components already described there extend a series of transverse support bars or channel beams of which the two designated 17 and 18, see also Fig. 5, are shown to be solid bars welded to the work level or stanchion plates 15 and 16 in spaced relation to each other.

Each of the beam elements 17 and 18 is a sturdy member and the two are preferably aligned at the same horizontal level whereby to afford a rigid bed plate support to the cantilever extension arms 19 and 21 as best indicated in Figs. 2 and 5.

Each cantilever arm or beam 19 and 21 is preferably bored and tapped as at 22 so that it may receive the threaded extremity of a shoulder bolt 23 which carries a flanged shoulder 24 for the purpose of enabling the assembly to be securely clamped between the two parallel frame beams 17 and 18. By means of the foregoing arrangement the foremost extremities of the cantilever beams 19 and 21 are permitted to extend well forward of the side-frame connecting bars 17 and 18 so that an abundance of surrounding clearance is afforded for an attendant to make close inspections and perform critical control over the piece parts 12 which are supported in cradles disposed within the lateral area of the overhanging portion of the cantilever elements.

It will be understood that cantilever beams 19 and 21 may be secured upon the transverse beams 17 and 18 at various distances from one another and also at different locations between the side-frame elements 15 and 16 in accordance with any manner most suitable for the type of piece part to be tested. At the forward end of each cantilever beam 19 and 21 and preferably near the inside face surface thereon, there are located two uprights 27 and 28 of which the rearmost ones 27 are equipped at their upper extremities with mounting blocks 29, see particularly Fig. 5, while the foremost ones 28 are correspondingly equipped with somewhat different mounting blocks designated 31.

The mounting blocks 29 are drilled so as to receive a pair of shoulder screws 32 threadably engaged within the upright 27. Between the mounting block 29 and an auxiliary face plate 34 there is clamped a pendulously extending spring element 33 which is on that account restricted in its flexure to the motion designated in dotted outline in Fig. 5 by reference numeral 35, but prevented from undergoing any perceptible transverse flexure such as could be correspondingly designated in Fig. 7.

With respect to its companion spring member 37, however, which is hung from a single supporting screw or bolt element 38 from mounting block 31 carried by the upright 28, flexure such as that designated by the reference numeral 39, Fig. 5, is permitted while also a swinging movement due to the pivotal accommodation of bolt 38 is permitted as portrayed by the dotted outline positions 41.

Thus, it will be understood that while the half-bearing support frame or cradle 42 which is carried by the lower extremity of spring elements 33 and 37, as will be later described, is permitted to float in a left to right manner as viewed in Fig. 5, due to the flexible characteristics of its suspension the corresponding freedom to do so in an up and down direction as viewed in Fig. 8 is constrained by the relatively rigid beam dimension of immobilized spring 33 in contrast from the relatively free condition of the opposite spring 37.

As a consequence, the bearing support frame 42 is free to undergo a certain degree of distortion as represented by its several solid and dotted outline positions as indicated in Fig. 8. This permits the two half-bearing elements 43 and 44, each of which is integrally associated with its frame 42, to adjust itself laterally for the purpose of achieving accurate alignment where it is required to conform with proper journal support to the shaft projections 45 and 46 that extend from the rotor 12. Also, this degree of displacement constitutes a factor which permits the two shaft extremities 45 and 46 each to undergo its own characteristic transverse wobble, as where an out-of-balance condition in a workpiece having its preponderant dimension axially is possessed of two or more resolutions of unbalance lying in different transverse planes.

At the lower ends the flexible elements 33 and 37 are bolted to sidewardly extending projections 47 and 48 respectively of the cradle support frame 42, each in the same characteristic manner as its upper extremity is secured to the projecting blocks 29 and 31. By this is meant that the lowermost end of element 33 is secured to its projection 47 in an immobilized manner by the provision of two securing bolts 49 whereas the lower end of spring 37 is pivotably secured by but a single bolt 51. The range of freedom in swinging which is thus permitted to develop in each of the cradle members 42 is one which permits the horizontal axis of a supported journal lying in the half-bearings 43 to undergo lateral variation as best indicated in Fig. 8, and this conformation is accomplished in a freely yielding manner whereby to produce no substantial damping effects which might tend to diminish the amplitude readings as will now be discussed.

The machine herein disclosed is particularly adapted to the type of dynamic balancing which employs electrical devices for generating potentials which may be recorded on a meter or which may trigger a stroboscopic illumination device for denoting the amount and angular position of unbalance in relation to a reference point. Accordingly, each cradle 42 is purposefully designed as a narrow, lightweight, yet rigid framework, providing at its upper end a semi-circular bed groove 52 for receiving the half-bearing 43 and a pair of screw clamped batten plates 53 which may be quickly and easily adjusted for the replacement of alternative half-bearings 43 to accommodate other journal dimensions. The lightness in its weight contributes towards a minimum of inertia so that the unbalance forces exerted upon it permit the frame 42 to vibrate in rhythm with the workpiece and as nearly as possible in fullness to its amplitude.

The unbalance vibrations are transmitted by each of the frameworks 42 through a bracket bar 54 and through one of the shouldered screws 49 to a wire rod 55. Each rod 55 is articulated to its bracket bar 54 as at 56 by an adjustment screw which serves the purpose of affording accurate linear alignment between the two members free of any internal tension or strain. In this way the unbalance vibrations may be communicated by the ends of the rods 55 to the threaded coil stems 57, Fig. 5, of voltage generating elements 58.

As best observed in Fig. 5, each element 58 is independently supported upon a platform 59 integrally associated as through a downwardly extending mount block 61 with its related beam 19 or 21.

Through the aforedescribed arrangement not only is it made possible to dispose the bar and rod vibration transmitting rigging at a low and unobtrusive level where it is less likely to be encountered by an operator during the course of installation and removal of workpieces 12 and during the making of adjustments, but of important significance in a protective sense, it is made practical to locate the elements 58 underneath a transversely extending cover pan 62 which is constructed of sheet metal and designed to blend into and harmonize with a shelf plate 63 extending across and secured between the side frame plates 15 and 16.

Shelf 63 serves the principal utility of supporting a cabinet 65, Fig. 1, within which are contained all of the essential elements and circuitry of a balancing machine system.

During the use and operation of a balancing machine as aforedescribed, an operator will "set up" for a testing job by locating the two cantilever arms or beams 19 and 21 upon the transverse supporting beams 17 and 18 through the use of the already described adjustment bolt 23, spacing them apart a distance which corresponds with the distance between the axial journal shafts 45 and 46 of the workpiece. He will then install half-bearings 43 in the recesses 52 of each of the cradles 42 which has the proper journal surface to correspond with the journal extremities 45 and 46 and tighten the batten plates 53. The apparatus is then in readiness to receive sucessively, identical workpieces 12 for test and observation with notable freedom from obstruction and ample surrounding clearances so as to provide the required attendant conveniences which make for time-saving and trouble-free production line operations.

As each workpiece 12 is placed into position the power transmitting belt 66 driven from an underfed source of rotation over a series of idlers (not shown) is looped over a cylindrical surface of the workpiece and thereby is imparted a speed of rotation.

As the workpiece rotates, and assuming that it is possessed of one or more conditions of unbalance it will tend to develop a corresponding wobble as portrayed in Fig. 4, transmitting to each cradle support 42 a characteristic horizontal vibration as permitted by the flexibility and yield in its pendulous supporting springs 33 and 37. The amplitude and periodic instant of occurrence of each vibration may be different in each cradle support 42 and hence the voltages generated by the electromagnetic pickups 58 will differ correspondingly.

Since the electrical circuitry forms no essential part of the present invention, it will suffice to say that the aforedescribed obstruction-free arrangement of unbalance signal generation is utilized in the electric supervisory system as well as in the stroboscopic flasher which may be contained in a fixture element 67, Fig. 1, under known arrangement of electrical control. The flasher 67 is made to generate a short interval of illumination at a precise and corresponding instant in each rotary cycle whereby to produce a stationary image effect indicative, directly or by reference, of the angular location of the out-of-balance condition.

In order that this angular position may be unmistakably identified, the workpiece may be provided with an annular reference ring 78 bearing on its peripheral surface numerals or other markings which may be visually perceived under the stroboscopic lighting effect for the purpose of being associated later by the operator with the proper angular position on which an unbalance correction is to be made. In practice the operator will make one or more such observations as needed, relating to the arbitrarily selected planes in which the correction is to be made.

When this has been done, power belt 66 is lifted and workpiece 12 removed from the cradles. If the correction is to be one of subtraction, the operator will make a mental appraisal respecting the amount of mass that has to be removed in relation to each of two angular locations, one relating to the left-side cradle 42 and the other the right-side cradle. Because of the abundance of sidewise clearance, as best observed in Figs. 1 and 9, the removal of the workpiece 12 involves but a short and simple arm movement, whereafter the operator may turn to one side or the other in accordance with his whim or dexterity and apply the workpiece to a milling machine cutter, grinder, or other apparatus for removing the excess mass and to facilitate the mounting and use of integrally related correction devices. Thus the technique is resolved into a one-handed operation conducive of great speed and lending itself to be developed with finite accuracy following but brief experience. Thereafter, the workpiece is reinstalled and the belt loop 66 again applied and operated after the manner already described for the purpose of making a verification test. If the proper amount of mass has been removed (or applied), a concluding test will confirm the attainment of balance within accepted tolerances.

While the present invention has been explained and described with reference to certain specifically indicated embodiments, it will be understood nevertheless that numerous changes and variations are capable of being made without departing from its essential scope. Accordingly, for an understanding of this invention reference should be had to the hereinafter annexed claims.

The invention claimed is:

1. In a balancing machine, an integrally constructed main frame comprising a pair of parallelly disposed side stanchion plates and a pair of transversely connecting beam elements, a pair of cantilever extension arms secured posteriorly of the foremost portion of said frame to said beam elements, said arms having overhanging portions projecting forwardly towards the front of said machine, each of said arms having a pair of parallel mutually spaced uprights, a journal support cradle pendulously suspended from each pair of said uprights whereby to respond to out-of-balance vibrations generated by workpieces journalled in said cradles, a pickup device carried on the posterior extremity of each of said arms, a vibration transmitting link between each pickup device and its related cradle, and means associated with the pickup devices for producing electrical pulsations in accordance with the amplitudes and periodicity of said vibrations in respect to the rotary cycles of workpieces journalled in the cradles.

2. An apparatus for supporting rotatable workpieces for unbalance testing which includes a rigid framework including a pair of horizontal beams, a pair of cantilever arms carried upon said beams each having at its foremost extremity a pair of vertically extending uprights spaced from each other and bearing pendulous flat steel springs, means for securing said arms at their rearmost extremities to said beams, cradles disposed between and pendulously supported from said flat steel springs whereby to permit said cradles to respond vibrationally to unbalance in a direction parallel to said arms induced by rotors carried in said cradles, each of said pairs of springs including one spring rigidly mounted to its upright and one spring pivotally mounted to its upright whereby to permit its cradle to respond shiftably to wobble gyrations induced by workpieces rotated therein.

3. A cradle support for balancing machines which comprises, a pair of spaced vertical uprights, a cradle proportioned to dwell between said uprights, mount projections extending inwardly at the upper ends of said uprights and outwardly at the lower ends of said cradle, a pair of flexible flat elements each suspended from one of said upright mount projections and bolt means for securing each of said flexible flat elements to its mount projections, one of said bolt means being multiple for rigidly securing its flexible flat element to its upright mount projection, and the other of said bolt means being single for pivotally securing its flexible flat element to its upright mount projection.

4. In a balancing machine, a pair of side frames, a system of transverse beams extending between said side frames at bench level and located substantially posterior of the frontal extremities of said side frames, a pair of cantilever arms including rearmost portions laterally adjustable in said system of transverse beams and foremost portions projecting into a space in front of said transverse beams, a cradle assembly carried upon the foremost portions of each of said cantilever arms including half-bearing journals for supporting rotor type workpiece shafts whereby workpieces carried in said cradle assemblies are disposed in said space substantially clear of said transverse beams, affording access to inspection thereof, each said cradle assemblies including a pair of spaced uprights having oppositely facing mount blocks, suspension spring blades hanging from each of said mount blocks, multiple screws for securing one of said spring blades to its mount block, and single screw means for securing the other of said spring blades to its mount block whereby to afford a limited pivotal action to the latter mount block in its longitudinal alignment for affording a moderate edgewise yield pivotally to align the cradle assembly in respect to its carried workpiece rotary axis.

5. In a balancing machine, a pair of parallel side support frames, a plurality of rigid transverse beam elements integral with said frames, at least two of said beam elements being parallel and located at a distance substantially posterior of the front of the machine, a pair of cradles each having a workpiece support journal, a cantilever arm for supporting each of said cradles at its front end, means for adjustably securing each of said cantilever arms at its rear end to said beam elements so that an abundance of sidewise access is made available at the front of the machine and at the sides of said cantilever arms for facilitating placement and examination of workpieces in their said cradles, a pair of spaced upright posts carried on each of said cantilever arms, each of said pair of posts having mutually facing uppermost mount blocks, said cradles being adapted to repose each between its pair of said upright posts, and pairs of parallel leaf spring suspensions having their upper ends secured in said post mount blocks and their lower ends secured to the bottoms of said cradles, whereby said cradles are permitted to float and respond in a direction transverse to the parallel spring suspensions, one of said leaf spring upper ends being rigidly secured in its mount block and the other one of said leaf spring upper ends being pivotally secured in its mount block.

6. The combination set forth in claim 5 including voltage generators carried at the rear of said beams, and links connecting said cradles to said voltage generators, said links comprising relatively rigid rod elements secured to the lowermost extremities of said cradles and extending horizontally in close spaced relation above their related beams.

References Cited in the file of this patent

UNITED STATES PATENTS

| | | |
|---|---|---|
| 2,487,035 | Weaver et al. | Nov. 1, 1949 |
| 2,551,480 | Whitney | May 1, 1951 |
| 2,651,937 | Martin et al. | Sept. 15, 1953 |
| 2,663,184 | Merrill et al. | Dec. 22, 1953 |